United States Patent
Maurizio et al.

(10) Patent No.: US 8,097,686 B2
(45) Date of Patent: Jan. 17, 2012

(54) MULTISTAGE PROCESS FOR THE POLYMERIZATION OF OLEFINS

(75) Inventors: Dorini Maurizio, Mantova (IT); Giuseppe Penzo, Mantova (IT); Rinaldi Riccardo, Mantova (IT)

(73) Assignee: Basell Poliolefine Italia s.r.l., Milan (IT)

( * ) Notice: Subject to any disclaimer, the term of this patent is extended or adjusted under 35 U.S.C. 154(b) by 151 days.

(21) Appl. No.: 12/733,773

(22) PCT Filed: Aug. 27, 2008

(86) PCT No.: PCT/EP2008/061234
§ 371 (c)(1),
(2), (4) Date: Mar. 19, 2010

(87) PCT Pub. No.: WO2009/037080
PCT Pub. Date: Mar. 26, 2009

(65) Prior Publication Data
US 2010/0305283 A1     Dec. 2, 2010

Related U.S. Application Data

(60) Provisional application No. 60/995,037, filed on Sep. 24, 2007.

(30) Foreign Application Priority Data

Sep. 19, 2007 (EP) .................... 07116771

(51) Int. Cl.
C08F 2/00 (2006.01)
C08F 210/00 (2006.01)
C08G 85/00 (2006.01)
B01J 19/18 (2006.01)

(52) U.S. Cl. .............. 526/64; 526/65; 526/348; 526/68; 526/70; 422/132

(58) Field of Classification Search .............. 526/64, 526/65, 68, 70, 348; 422/132
See application file for complete search history.

(56) References Cited

U.S. PATENT DOCUMENTS

| | | | |
|---|---|---|---|
| 4,420,592 A | 12/1983 | Kato et al. | |
| 4,902,483 A | 2/1990 | Raufast | |
| 5,688,865 A | 11/1997 | Ali et al. | |
| 5,698,642 A | 12/1997 | Govoni et al. | |
| 6,252,015 B1 * | 6/2001 | Vincenzi et al. ................ | 526/62 |
| 6,413,477 B1 | 7/2002 | Govoni et al. | |
| 7,115,687 B2 | 10/2006 | Vuorikari et al. | |
| 2004/0072971 A1 | 4/2004 | Govoni et al. | |

FOREIGN PATENT DOCUMENTS
WO   WO 2008/058839   5/2008

* cited by examiner

Primary Examiner — William Cheung
(74) Attorney, Agent, or Firm — Dilworth IP, LLC

(57) ABSTRACT

A process for the multistage polymerization of olefins in a sequence of an upstream slurry reactor and a downstream gas-phase reactor, the transfer of polymer from the upstream reactor to the downstream reactor comprising the following steps:

Figure 1:
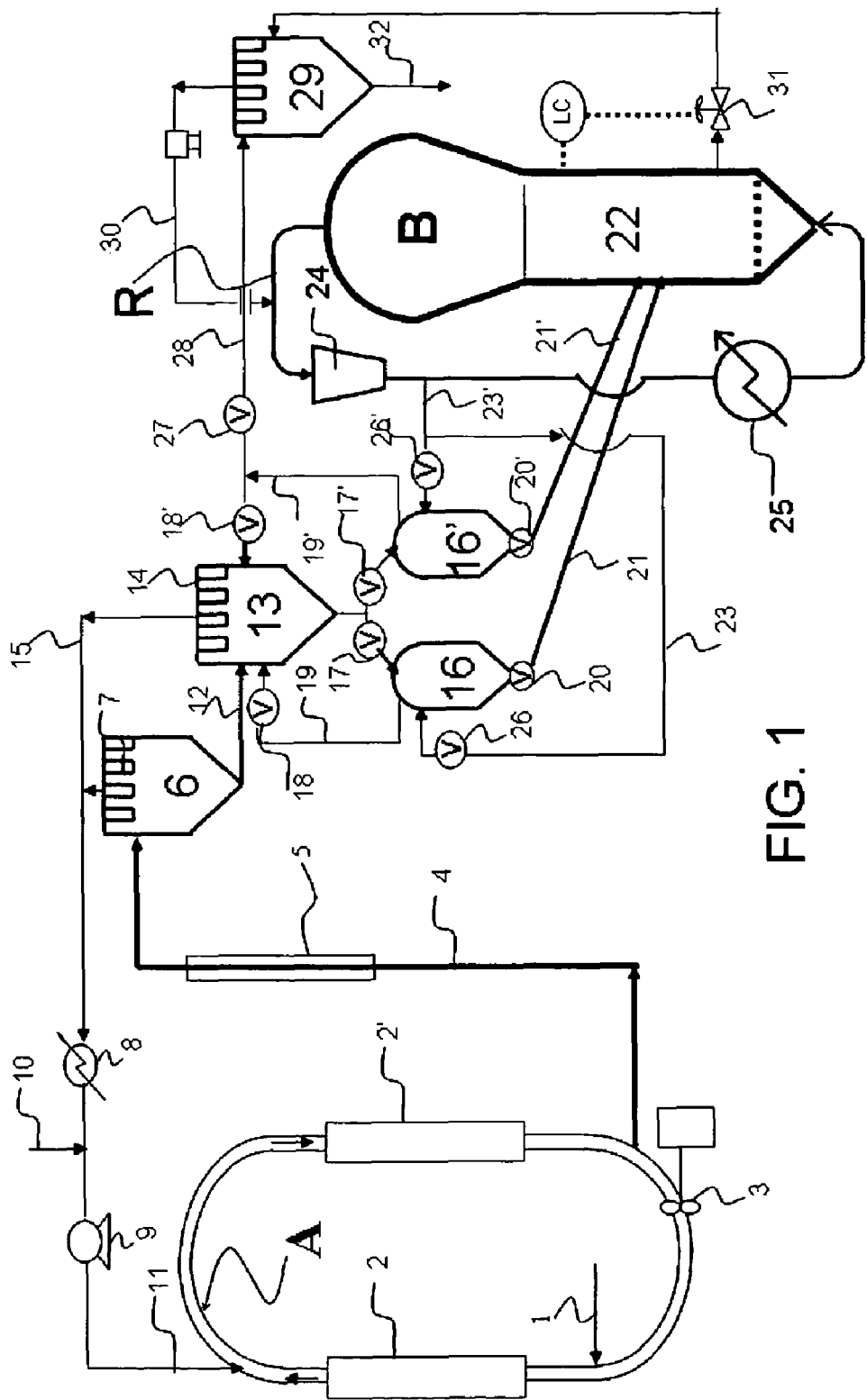

a) heating the slurry of polyolefin particles to evaporate the liquid polymerization medium;

b) separating the polyolefin particles from the obtained gaseous phase in at least a separation chamber;

c) transferring the polyolefin particles to said downstream reactor by means of a couple of lock hoppers working intermittently in parallel, where one of said lock hoppers is continuously filled with the polymer coming from said separation chamber, while simultaneously the other one is continuously pressurized by means of a gas comprising the reaction mixture coming from said downstream reactor.

19 Claims, 1 Drawing Sheet

MULTISTAGE PROCESS FOR THE POLYMERIZATION OF OLEFINS

This application is the U.S. national phase of International Application PCT/EP2008/061234, filed Aug. 27, 2008, claiming priority to European Patent Application 07116771.2 filed Sep. 19, 2007, and the benefit under 35 U.S.C. 119(e) of U.S. Provisional Application No. 60/995,037, filed Sep. 24, 2007; the disclosures of International Application PCT/EP2008/061234, European Patent Application 07116771.2 and U.S. Provisional Application No. 60/995,037, each as filed, are incorporated herein by reference.

The present invention relates to a multistage process for the polymerisation of olefins The invention relates also to an apparatus for carrying out such a multistage polymerization process.

The polymerization of olefins in two or more serially connected polymerization reactors allows to produce olefin polymers with improved mechanical properties. This is made possible by choosing polymerisation conditions in the second or subsequent reactors different from the reaction conditions existing in the first polymerization reactor. Typically, olefin polymers grow on granules including a catalyst component, which continues to exert a catalytic activity even when the polymer particles are transferred to a successive polymerization reactor. The polymer resulting from the first polymerization reactor is transferred to the second polymerization reactor, where polymerization is continued under different conditions. Therefore, different fractions of polymer can grow on the same catalytic granule by maintaining a different concentration of monomers in each reactor.

Examples of polymers that may be produced by a multistage polymerization process include bimodal or multimodal polymers obtained by maintaining a different concentration of chain terminator, such as hydrogen, in each reactor; and random or heterophasic copolymers obtained by polymerizing different (co)monomers in each reactor. The term "heterophasic copolymer" includes also in-reactor polymer blends.

It is also known the use of a multistage process comprising one or two slurry polymerization reactors and one or more gas-phase reactors connected successively to each other to produce random and/or impact copolymers of propylene, thereby expanding and modifying some mechanical and physical properties of conventional polypropylene products.

When propylene homopolymer is transferred from a slurry polymerization reactor to a successive gas-phase reactor, the slurry containing polypropylene must be necessarily heated and flashed in a flash vessel, so as to volatilize the liquid polymerization medium and to separate the polymer from the evaporated phase. It is clear that a direct transfer of the separated polymer from the flash vessel to the downstream gas-phase reactor would not allow to maintain different polymerization conditions in the downstream reactor, due to the substantial amount of gases and dissolved hydrocarbons associated to the polymer coming from the upstream reactor. Especially when a specific olefin monomer (e.g. propylene) is polymerized in the upstream reactor and this monomer is absent in the downstream reactor, it becomes important to prevent said monomer from entering the downstream polymerization apparatus, even in little amounts.

Some technical solutions to the above problem have been proposed in case of olefin polymerization performed in two serially connected gas-phase reactors.

According to EP-B-192427 the transfer of polymer from an upstream gas-phase reactor to the downstream gas-phase reactor is performed by means of a gas stream comprising the gas mixture coming from the gas recycle line of the downstream reactor. Said gas mixture has been cooled to a temperature of at least 20° C. lower than the temperature of the downstream reactor. The described transfer device comprises at least three separate vessels: a discharge vessel connected to the upstream reactor, equipped with valves to prevent excessive withdrawal of polymer from the upstream reactor; a decompression chamber equipped with valves and connected to the discharge vessel; a compression chamber equipped with valves and connected to the downstream reactor. The path of the polymer through this series of vessels and associated valves and pipes is rather tortuous and, in case of polymers having tendency to be sticky or to be compacted, can generate undesired polymer aggregates and, eventually, chunks that compromise the operation of the plant. Above all, the above transfer device suffers the great disadvantage of failing in providing a continuous transfer of polymer from the upstream gas-reactor reactor to the downstream reactor, as pointed out by the disclosure of EP-B-192427 (col. 14, lines 14-19): all the operations of withdrawal, decompression, compression, transfer and introduction of polymer into the downstream reactor are performed periodically.

A similar transfer device is disclosed in EP-B-050013. According to this patent, the transfer device comprises a container where the polymer is discharged, said container defining an inert gas zone wherein an inert gas is passed upwardly from the bottom to replace most of the reaction gas mixture coming from the upstream reactor. Afterwards the polymer, always maintained in an atmosphere of the above inert gas, is transferred to a small chamber (polymer collection zone), which is connected with the gas reaction mixture coming from the downstream reactor. The replacement of gas reaction mixture with an inert gas helps to reduce or to prevent polymerization in the transfer device, thereby eliminating the deposition of polymer onto the walls of the transfer device and blocking thereof. However, the proposed solution suffers the disadvantage that the reaction gas mixture in the second polymerisation reactor is considerably enriched in said inert gas. This makes it necessary to introduce a considerable additional quantity of olefin monomers in the downstream reactor, which may require an increase of the reactor size or an increase of the total pressure of the gas in this reactor. Moreover, also the transfer device described in EP-B-050013 fails in providing a continuous transfer of polymer from the upstream reactor to the downstream reactor. This is because the small chamber collecting the polymer must be first loaded with the polymer, and only successively the polymer can be discharged therefrom by opening the line connected with the gas reaction mixture from the downstream reactor.

EP-B-503791 relates to a multistage gas-phase process for producing a bimodal ethylene polymer blend in a sequence of two fluidised bed reactors. A high molecular weight (HMW) polyethylene is produced in the first reactor, successively transferred into the second reactor wherein a low molecular weight (LMW) polyethylene is produced. The transfer device comprises a discharge tank for collecting the HMW polymer discharged from the first reactor and a transfer hose connected to the second gas-phase reactor. Periodically, when sufficient HMW polymer is formed in the first reactor, the polymer and catalyst are transferred to the discharge tank, in which the reaction gas entrained with the polymer is vented from the top of the discharge tank. Once the desired amount of polymer has been introduced into the discharge tank, the transfer system to the second reactor is activated by opening a suitable valve to force the HMW polymer into the transfer hose. The transfer hose is therefore isolated from the upstream discharge tank and pressurized with reactor-cycle gas coming from the downstream reactor. The transfer device described in EP 503791 is efficient in preventing the reaction gas of upstream reactor from entering the downstream reactor, however this transfer device cannot ensure a continuous and reliable transfer of polymer between the two gas-phase reactors, since all the operations of polymer discharge, degassing, pressurization, transfer and introduction of polymer powder into the downstream reactor are performed intermittently. Serious disadvantages are associated with the polymer transfer systems disclosed in the above prior art transfer systems. In case a device belonging to the transfer system is badly working or becomes clogged, the whole polymerization plant has to be shut down. Furthermore, from the operative point of view the discontinuous operation of polymer transfer leads to a distinct fluctuation in the level of the polymer bed inside the downstream reactor, when a batch of the polymer product is introduced into the downstream reactor. This fluctuation influences some operative parameters in the downstream reactor and may have a considerable impact on the quality of the produced polymer.

In the specific case of multistage polymerizations in an upstream slurry reactor and a downstream gas-phase reactor the above technical problem has not been properly faced, so that when a specific olefin monomer is wanted to be polymerized in the upstream reactor and not in the downstream reactor, it would be desirable to prevent said monomer from entering the downstream gas-phase reactor.

The need exists to carry out the polymer transfer from the upstream slurry reactor to the downstream reactor in a simple and reliable way, without any undesired alteration of the gas composition existing in the downstream reactor.

It is therefore an object of the present invention a process for the multistage polymerization of olefins in a sequence of an upstream slurry reactor and a downstream gas-phase reactor, the transfer of polymer from the upstream reactor to the downstream reactor comprising the following steps:
a) heating the slurry of polyolefin discharged from the upstream reactor to evaporate the liquid polymerization medium;
b) separating the polyolefin particles from the evaporated phase in at least one separation chamber;
c) transferring the polyolefin particles to said downstream reactor by means of a couple of lock hoppers working intermittently in parallel, where one of said lock hoppers is continuously filled with the polymer coming from said separation chamber, while simultaneously the other one is continuously pressurized by means of a pressurization gas coming from said downstream reactor.

The process for the polymerisation of olefins according to the present invention comprises a multistage polymerization carried out in an upstream slurry reactor and a downstream gas-phase reactor. The process may also comprise additional reactor(s), upstream the slurry reactor or downstream the gas-phase reactor, where the polymerization is carried out in the gas-phase or in a liquid polymerization medium.

The upstream reactor of the present invention operates a liquid-phase polymerization of one or more olefins, so as to produce a polymer slurry. The liquid polymerization medium comprises one or more olefin monomers, hydrogen as molecular weight regulator and optionally an inert hydrocarbon as a polymerization diluent. The use of the liquid monomer as the polymerization medium allows to maximize the rate of the polymerization reaction by providing high monomer concentration, and to simplify the process by eliminating use of solvents or diluents that must be purified and recycled. Such polymerization may be carried out in a stirred tank with a jacketed wall to remove the heat of polymerization, or in a jacketed loop reactor, which provides a high ratio of cooling area to reactor volume.

The upstream polymerization reactor is preferably a loop reactor, which is operated at a pressure of from 22 to 50 bar, preferably from 30 to 45 bar. The polymerization temperature ranges from 60 to 90° C., preferably from 70 to 85° C.

The downstream gas-phase reactor used in the multistage process of the invention can be any type of gas-phase reactor, for example either a gas-phase fluidized-bed reactor or a stirred bed reactors, wherein a bed of polymer is formed in the presence of a polymerization catalyst. For the purposes of the process of the invention, it is important that most of the reaction fluid is in the gaseous state and the polymer is in particulate form. Also gas-phase polymerization reactors having two distinct interconnected polymerization zones, as described in EP-B-782587 and EP-B-1012195, can be suitably used in the process of the invention.

The preferred downstream gas-phase reactor is a fluidised bed reactor. This type of reactor is provided with a device to discharge solids from the bottom of the reactor, and with an external recycle line for the reaction gas mixture, equipped with a compressor and a heat exchanger. Such recycle line ensures that the bed of polymer is maintained in a fluidized state.

As the polymerization catalyst, it is possible to use all known types of catalyst which are suitable for olefin polymerization. Particular mention may be made of Ziegler/Natta catalysts, chromium-based Phillips catalysts and single-site catalysts, in particular metallocene catalysts, without being restricted thereto.

Once discharged from the upstream reactor, the polyolefin slurry is depressurized and heated to a temperature higher than the temperature within the slurry reactor: under these conditions the liquid polymerization medium is evaporated. A vaporizer may be used to perform the heating of step a) of present invention. Preferably, the polyolefin slurry is transferred along a line provided with a steam jacketed pipe, as the vaporizer. Inside the steam jacketed pipe the temperature is increased to a value above the polymerization temperature in the upstream reactor and below the sticking temperature of the polyolefin, preferably in a range from 80 to 100° C.

The effluent stream leaving the jacketed pipe of step a) is substantially in two phases: solid and vapor. Said two-phase mixture is fed to the upper portion of a separation chamber aimed to perform step b) of present invention. The inlet of the two-phase stream in the separation chamber is performed tangentially to the walls of the separation chamber, so as that a centrifugal effect favors the solid/gas separation inside the separation chamber. The solid phase tends to fall downward due to gravity, while the vapor phase tends to flow upwards.

According to a preferred embodiment, multiple bag filters are arranged in the upper portion of the separation vessel of step b). The bag filters prevent the solid fines from exiting the upper portion of the separation vessel. A purging system may be used to clean the bag filters and prevent their plugging: the cleaning gas is preferably the same monomer as the unreacted monomer within the effluent stream. For example, if the unreacted monomer is propylene the purging gas is preferably propylene. The preferred number of bag filters will depend on the flux of the effluent stream, the size of the separation vessel, and the amount of solid fines within the effluent stream.

The gaseous stream taken from the separation vessel contains less than about 0.5 weight percent of fines, preferably less than about 0.1 weight percent of fines. Said gaseous stream is generally condensed using a heat exchanger and the condensed stream is recycled back to the upstream slurry reactor.

The lower portion of the separation vessel is preferably designed to facilitate the mass flow of the solid polymer particles including the solid fines. In one embodiment, the lower portion of the separation vessel is made from a polished metal surface having steeply pitched sides at an angle of between about 55° to about 90° from the horizontal, preferably between about 65° to about 90° from the horizontal Moreover, the lower portion of the separation vessel is preferably relatively small in diameter: a level detector is preferably installed in the lower portion of the separation vessel to allow for solids level control, and minimize the amount of unreacted monomer vapor leaving the bottom of the vessel with the solid fines.

According to a preferred embodiment of the invention, step b) involves the uses of two serially connected separation vessels operated at a decreasing pressure. The pressure within the high pressure separation vessel can range from 10 to 28 bar, preferably from 14 to 24 bar, while the low pressure separation vessel is operated at a pressure close to atmospheric one, in a range from 1.1 bar to 4.0 bar, preferably from 1.3 to 2.5 bar. As a consequence, the solid polymer discharged from the bottom of the high pressure separation chamber is fed with a tangential inlet at the upper portion of the low pressure separation chamber, where the separation of the solid from the vapor phase is completed. Also the low pressure separation vessel is preferably endowed with multiple bag filters, which prevent the solid fines from exiting the upper portion of said separation vessel.

After being efficiently degassed in the separation vessels of step b), the polyolefin particles are discharged from the bottom of the low pressure separation vessel and are transferred to a couple of lock hoppers working intermittently in parallel (step c). Each one of these lock hoppers operates in a continuous way this sequence of operations:
(1) loading with polymer particles coming from step b), while maintaining the hopper isolated from the downstream reactor;
(2) pressurization by means of a gas comprising the reaction mixture from the downstream reactor, while maintaining the hopper isolated from the separation chambers of step b).

During the pressurization (2) the polymer is also simultaneously discharged from the lock hopper and therefore transferred to the downstream reactor.

When a lock hopper is involved with step (1), the other one is involved with step (2) and viceversa. This working in parallel maximizes the discharge flow rate from the upstream slurry reactor and optimizes the transfer of polymer, substantially continuous, from the upstream reactor to the downstream gas-phase reactor. Furthermore, the pressurization by means of a gas mixture coming from the downstream reactor reduces the risk of undesired changes in the reaction conditions existing in the downstream gas-phase reactor.

According to a preferred embodiment of the invention, the pressurization gas which pressurizes the lock hoppers is withdrawn from the recycle line of the downstream reactor at a point downstream the compressor and upstream the heat exchanger. According to this aspect, the portion of the reaction gas mixture fed to the lock hoppers does not undergo any cooling stage, therefore its temperature is substantially not lower than the temperature of the reaction gas mixture in the downstream reactor.

Furthermore, such gaseous stream coming from the recycle line of the downstream reactor is preferably fed to the lock hoppers, without any addition of inert gas or make-up monomers.

Therefore, its composition is substantially the same as that of the reaction gas mixture within the downstream reactor.

According to another aspect of the invention, the lock hoppers of step c) of the invention are generally located at a point above the level of the fluidised bed in the downstream reactor, so that the transfer of polymer to the downstream gas-reactor is performed by a combined action of pressure and gravity.

As a result of the sequence of operative steps of present invention, the olefin monomers reacting in the upstream slurry reactor are transferred to the downstream gas-phase only in negligible amounts.

Another advantage of the process according to the invention is that the transfer of polymer from the upstream reactor to the downstream reactor requires neither addition of inert gas in the transfer line, nor a cooling of the gas stream used to transfer the polymer into the downstream reactor.

The invention also relates also to a polymerization apparatus comprising an upstream slurry reactor, a downstream gas-phase reactor and a transfer device transferring the polymer from said upstream reactor to said downstream reactor, the downstream gas-phase reactor having an external recycle line R that continuously recycles the fluidization gas through said reactor, said transfer device comprising:
  a vaporizer for heating the polyolefin slurry discharged from said upstream reactor;
  at least a separation chamber for separating the polyolefin particles from the evaporated phase;
  a couple of lock hoppers, placed in a parallel arrangement, directly connected to said recycle line R of said downstream reactor and in connection with the polymerization zone of said downstream reactor.

According to an embodiment of the above polymerization apparatus, the vaporizer for heating the polyolefin slurry is a steam jacketed pipe, through which the polyolefin slurry is flowed.

Preferably the polymerization apparatus comprises a high pressure separation chamber and a low pressure separation chamber to separate the polyolefin particles from the evaporated phase.

BRIEF DESCRIPTIONS OF THE DRAWINGS

The invention is further illustrated by means of FIG. 1, which is a simplified diagram representing a preferred, but non-limiting embodiment of present invention.

In the apparatus schematically represented in FIG. 1, A is a loop reactor for the slurry polymerization of olefins, while B is a fluidised-bed reactor for the gas-phase polymerisation of olefins. Within the purpose of present description, the loop reactor A may be the first polymerisation reactor of the multistage process, or alternatively, other reactor(s) can be arranged upstream the loop reactor A. For instance, the loop reactor A can receive from line 1 a polymer produced in an upstream reactor or a prepolymer or a polymerization catalyst.

Schematically, catalyst components, co-catalyst, and propylene are introduced into the loop reactor A, as shown by arrow 1. In the case of use of a Ziegler/Natta catalyst comprising a solid component supported on active $MgCl_2$, the solid component can be fed as such or preferably in a prepolymerised form.

The vertical legs of the loop reactor A are provided with cooling jackets 2, 2' to remove the heat developed by the polymerization reaction. Most of polymer slurry is continuously recirculated inside the loop reactor A by means of the axial pump 3, but a fraction thereof is continuously discharged from the loop reactor A and enters the transfer line 4.

The downstream gas-phase reactor is a fluidized bed reactor B equipped with a recycle line R to continuously recycle the fluidisation gas through the fluidised polymer bed. Transfer of polymer particles from the slurry loop reactor A to the gas-phase reactor B is carried out by the process of present invention, substantially comprising the evaporation step a), the separation step b) and transfer means according to step c) of the invention.

In the embodiment shown in FIG. 1, the evaporation step a) is performed in a heated pipe, while the separation step b) is carried out in a sequence of two separation chambers, operated at a decreasing pressure.

The polymer slurry discharged from the loop reactor A flows through the transfer line 4 equipped with a steam jacketed pipe 5. The polymer slurry is therefore heated in the jacketed pipe 5 and brought to a temperature higher than the temperature within the loop reactor A.

Under these conditions the liquid polymerization medium is evaporated, so that a two-phase mixture comprising solid polymer and the evaporated monomers is fed at the inlet of a high pressure separation chamber 6, wherein the solid polymer particles are separated from the vaporised monomer(s). Bag filters 7 are arranged in the upper portion of the separation vessel 6 in order to prevent the solid fines to be entrained with the gas stream.

The particles of solid polymer fall by gravity towards the bottom of the high pressure separation chamber 10, while the gaseous stream flow upwards to the top of chamber 10 and is conveyed to a monomer recovery section comprising condensing means 8, a line for feeding make-up monomers, and a compressor 9. Make-up monomers supplied via line 10 and the recycled monomers from the separation chamber 6 are fed via line 11 to the loop reactor A.

The polyolefin particles discharged from the bottom of the separation tank 6 are transferred via line 12 to a low pressure separation chamber 13 equipped with multiple bag filters 14 in its upper portion. The polymer particles are further separated from the gaseous components in the low pressure separation vessel 13. Gas separated from solid polymer passes through the bag filters 14 in the upper portion of the separation chamber 8, and is successively recycled to the loop reactor A via line 15 and 11.

A couple of lock hoppers 16, 16' is placed downstream the low pressure separation chamber 13, the latter being placed at a point high enough to make possible successive discharge of solids into the lock hoppers 16, 16' essentially by gravity.

Each of said lock hoppers 16, 16' is connected to said separation chamber 13 through two separate discharge valves 17 and 17'. The lock hoppers 16, 16' have a conical lower portion with walls inclined of an angle greater that the repose angle of the polymer granules.

Filling of lock hopper 16 is promoted by opening the discharge valve 17 placed downstream the separation chamber 13 and simultaneously by opening valve 18 placed on line 19, which is a vent pipe allowing to vent into the separation chamber 13 residual gas transferred into lock hopper 16 together with the polymer particles. Likewise, filling of lock hopper 16' is promoted by opening the discharge valve 17' placed downstream the separation chamber 13 and simultaneously by opening valve 18' placed on line 19', which is a vent pipe allowing to vent into the separation chamber 13 residual gas transferred into lock hopper 16' together with the polymer.

The lock hoppers 16, 16' are preferably placed below the separation chamber 13 and above the polymer bed 22 of the downstream reactor B.

Lock hopper 16, 16' are provided, respectively, with bottom discharge valves 20, 20' in connection with the transfer pipes 21, 21', which alternatively transfer the polymer particles into the polymer bed 22 of the downstream gas-phase reactor B. Pipes 21 and 21' are inclined of an angle with respect to vertical line. Preferably said angle is not greater than 45°, more preferably it is comprised between 15° and 30°.

The gas recycle line R, which continuously recycles the fluidisation gas through the polymer bed 22 of the downstream reactor B is connected via lines 23, 23' to the upper part of the lock hoppers 16, 16'. The stream of recycled gas is taken at a point of the recycle line R located just downstream the compressor 24, upstream the heat exchanger 25. By opening the pressurization valve 26 the recycled reaction mixture coming from the downstream reactor B can pressurize the lock hopper 16. Likewise, by opening the pressurization valve 26' the recycled reaction mixture coming from line R of the downstream reactor B can pressurize the lock hopper 16'.

The two hoppers 16 and 16' work intermittently in parallel according to a regular sequence controlled by a central control unit. Filling of lock hopper 16 is performed by closing valve 20 and opening valves 17 and 18: solids are therefore discharged from chamber 13 and fill hopper 16, while gas entrained with the polymer is vented through valve 18 and returned to the separation chamber 13. Once filling of hopper 16 is completed, valves 17 and 18 are closed, while valves 20 and 26 are opened. Opening of valve 26 causes a pressurisation of hopper 16 by a portion of the reaction gas mixture of reactor B pumped by the compressor 24 through line 23. The simultaneous opening of the discharge valve 20 allows to discharge polymer by combined effect of pressure and gravity through pipe 21 into the polymer bed 22 of downstream reactor B. Use of a portion of the reaction gas mixture withdrawn just downstream compressor 24 of recycle line R allows to exploit the total pressure head available from the compressor 24, which makes it possible to transfer polymer from hopper 16 to the reactor B at a high flow rate. When the polymer discharge from hopper 16 is completed, valves 20 and 26 are closed.

The same sequence of operations, but out of phase, is performed by the hopper 16' by acting on the corresponding valves 17', 18', 20' and 26'.

While the polymer is transferred from the separation chamber 13 into the first lock hopper 16, the discharge valve 17' is maintained closed. In the meanwhile, during the filling of hopper 16, the valves 20' and 26' are opened, thus causing the pressurization of hopper 16' and, accordingly, the transfer of polymer particles from hopper 16' to the downstream reactor B via pipe 21'.

When filling of hopper 16 is completed, discharge valve 17 is closed and simultaneously valves 17' and 18' are opened, so as to start the filling of the second hopper 16': valves 20' and 26' are closed, so that hopper 16' is filled with the polymer coming from separation chamber 13. During the filling of hopper 16', the valves 20 and 26 are opened, thus causing the pressurization of hopper 16 and, accordingly, the transfer of polymer particles from hopper 16 to the downstream reactor B via pipe 21.

Pressure is released from hopper 16' through a valve 27 mounted on a line 28 leading to a separation chamber 29, where a gas mixture is separated from the polymer discharged from the reactor B. The separation chamber 29 has the same design as the low pressure separation chamber 13. The gas mixture exiting the top of separation chamber 29, after being recompressed, is reintroduced via line 30 into the recycle line R of the reactor B. When pressures have been balanced, a new transfer cycle can be performed.

The polymer is discharged from the downstream reactor B by means of a control valve 31 placed in correspondence of the bottom of the fluidised bed 22, and is conveyed to the separation chamber 29, where it is subjected to degassing. The degassed polymer is discharged via line 32 from the bottom of separation chamber 29 and may be transferred to a successive polymerization reactor or to a finishing treatment stage, as it is known to the person skilled in the art.

It is apparent that the process of present invention makes possible a continuous transfer of polymer from the slurry loop reactor A to the gas-phase reactor B, since while one of the two lock hoppers is filled with polymer coming from separation chamber 13, the other lock hopper is emptied, thus transferring polymer into the downstream reactor B. The result is that polymer is transferred without any interruption into the downstream reactor B by means of pipes 21 and 21'.

Optionally the pipes 21, 21' may be continuously flushed by a portion of the reaction gas mixture withdrawn from the line 23, so that any deposit of solid in said pipes is avoided.

The design of the transfer device and the operative sequence of step b) and polymer loading/pressurisation-transfer in step c) are such that the level of polymer in the separation chamber 6 and 13 is almost constant. Typically valves 20, 26 and 20', 26' are actuated by a signal triggered by the level of solid in the separation chamber 13.

The olefin monomers polymerized by the process of the invention have formula $CH_2=CHR$, where R is hydrogen or a hydrocarbon radical having 1-12 carbon atoms. Examples of polyolefins that can be obtained are:

- heterophasic copolymers comprising a semi-crystalline polypropylene and one or more elastomeric ethylene/butene-1 copolymers;
- impact-resistant propylene polymers obtained by sequential polymerization of propylene and mixtures of propylene with ethylene containing up to 30% by weight of ethylene;
- isotactic polypropylene and crystalline copolymers of propylene and ethylene and/or other α-olefins having a content of units derived from propylene of more than 85% by weight;
- isotactic copolymers of propylene and α-olefins, such as 1-butene, with an α-olefin content of up to 30% by weight;

In case of polymerizing propylene in the upstream slurry reactor, a liquid mixture comprising propylene, hydrogen as molecular weight regulator, and optionally an inert hydrocarbon, is fed to the upstream loop reactor in the presence of a highly active catalyst of the Ziegler-Natta or metallocene type. Preferably, the polymerization is carried out at low concentrations of the inert hydrocarbon, so that liquid propylene is substantially the reaction medium (bulk polymerization). In the loop reactor the propylene concentration is comprised between 60 and 100% by weight, preferably between 75 and 95%, based on the total amount of liquid present in the reactor. The remaining part of liquid comprises the inert hydrocarbon, hydrogen and one or more α-olefin comonomers, if any. The preferred comonomer is ethylene.

The multistage olefin polymerization herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 $C_{10}$ hydrocarbon group, internal electron donor compounds can be supported on the $MgCl_2$.

Typically, they can be selected among esters, ethers, amines, and ketones. In particular, the use of compounds belonging to 1,3-diethers, phthalates, benzoates, and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor.

These external electron donors can be selected among, glycols, esters, ketones, amines, amides, alkoxysilanes and ethers. The electron donor compounds (ED) can be used alone or in mixture with each other. Preferably the ED compound is selected among aliphatic ethers, esters and alkoxysilanes. Preferred ethers are the 1,3-diethers.

Preferred esters are the alkyl esters of C6-C20 aromatic carboxylic acids and in particular phthalates and benzoates.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are those based on chromium compounds, such as chromium oxide on silica, also known as Phillips catalysts, and single site catalysts, for instance metallocene-based catalyst systems.

The catalyst may suitably be employed in the form of a pre-polymer powder prepared beforehand during a pre-polymerization stage with the aid of a catalyst as described above.

The pre-polymerization may be carried out by any suitable process, for example, polymerization in a liquid hydrocarbon diluent or in the gas phase using a batch process, a semi-continuous process or a continuous process.

The following examples will further illustrate the present invention without limiting its scope.

EXAMPLES

Characterization

Melt index L (MIL) [dg/min] measured according to ISO 1133 Solubility index (XS) [wt %]: percentage of copolymer soluble in ortho-xylene at 25° C.

A weighed amount of sample is dissolved in ortho-xylene at 135° C.: the solution is cooled under controlled conditions and maintained at 25° C. so that the insoluble material precipitates.

The precipitate is then filtered, and after filtration an aliquot of filtered solution is evaporated and weighed (total solubles).

Example 1

A heterophasic copolymer comprising a semi-crystalline polypropylene and a rubbery ethylene/butene-1 copolymer is produced by means of a process setup comprising:
- an activation vessel (not shown in FIG. 1) for the pre-contact of the catalyst components;
- a slurry loop reactor A;
- a steam jacketed pipe 5 to perform step a) of present invention;
- a sequence of two separation chambers 6, 13 to perform step b) of present invention;
- a couple of lock hoppers 16, 16' to carry out step c) of present invention;
- a fluidised bed reactor B.

Catalyst Activation and Prepolymerization

A Ziegler-Natta catalyst system is used as the polymerization catalyst, comprising:
- a titanium solid catalyst component prepared with the procedure described in EP 395 083, Example 3, according to which diisobutyl phthalate is the internal donor;
- triethylaluminium (TEAL) as the cocatalyst;
- dicyclopentyldimethoxysilane (DCPMS) as the external donor.

The above solid catalyst component (hereinafter referred as the "sol.cat.") is fed to the pre-contacting vessel, the weight ratio TEAL/sol.cat being of 14, the weight ratio TEAL/DCPMS being of 3. The above components are pre-contacted at a temperature of 12° C. for 22 minutes.

Slurry Polymerization

The activated catalyst discharged from the activation vessel is continuously fed to a slurry loop reactor to produce a semi-crystalline polypropylene.

According to the embodiment shown in FIG. 1, liquid propylene is polymerized in the loop reactor A using $H_2$ as the molecular weight regulator. No comonomer is fed to this reactor: the polymerization of propylene is carried out at a temperature of 70° C. and at a pressure of 40 bar.

A polypropylene slurry having a polymer concentration of 55% by weight is discharged from the loop reactor A and is conveyed to the jacketed pipe 5, which is externally heated by means of hot steam. The polymer slurry flowing through the pipe 5 is subjected to heating up to reach the temperature of 85° C. with consequent evaporation of the liquid monomer.

The stream of solid polymer and evaporated propylene obtained at the outlet of the pipe 5 is sent to a high-pressure separation chamber 6, where the evaporated propylene is separated from the polymer particles. The tangential entry of the above stream ensures a gas/solid separation by centrifugal effect.

The high-pressure separation chamber 6 is operated at the pressure of 18 bar: the particles of solid polymer fall down by gravity towards the bottom of the chamber, while gaseous propylene passes through a bag filter 7 in the upper portion of the separation chamber 6, and is successively recycled to the loop reactor A.

Polypropylene particles are discharged from the bottom of separation chamber 6 and are conveyed to a low-pressure separation chamber 13, which is operated at a pressure of 1.6 bar.

The particles of solid polymer fall down by gravity towards the bottom of the separation chamber 13 with a further removal of gaseous propylene from the polymer particles.

The degassed polypropylene particles are then transferred to a couple of lock hoppers 16, 16' placed below the low-pressure separation chamber 13 and above the polymer bed 22 of the downstream fluidised bed reactor B.

The two hoppers 16 and 16' work intermittently in parallel according to the operative steps explained in connection to the description of FIG. 1. When one of the hoppers is involved with filling of polymer coming from the separation chamber 13, the other hopper is pressurized by means of the gas mixture coming from the recycle line R of the fluidised bed reactor B.

Lock hoppers 16, 16' are provided, respectively, with bottom discharge valves 20, 20' in connection with the transfer pipes 21, 21', which alternatively transfer the polymer particles into the fluidised bed 22 of the downstream gas-phase reactor B.

In particular, the polymer falls by gravity from the low-pressure separation chamber 13 into the lock hopper 16 or 16' and during the filling step the pressure inside each lock hopper is decreased to the same value existing in the separation chamber 13 (i.e. 1.6 bar). On the contrary, when the polymer is discharged from each lock hopper 16 or 16' and passes to the downstream gas-phase reactor B, each lock hopper is pressurized at the pressure existing downstream the compressor 24 in the recycle line R of the gas-phase reactor B.

Gas-Phase Polymerization

An ethylene/butene-1 copolymer is prepared in the fluidized bed reactor B according to the operative conditions shown in Table 1: the gas-phase polymerization in reactor B is carried out at a temperature of 79° C. and at a pressure of 18 bar.

A rubbery ethylene/butene-1 copolymer is obtained in the reactor B and a heterophasic copolymer deriving from the above sequential polymerization is continuously discharged from the fluidized bed reactor B.

As a result of the sequence of operative steps of present invention, the olefin monomer reacting in the upstream slurry reactor (i.e. propylene) is transferred to the downstream gas-phase reactor only in negligible amounts, so that the olefin monomers reacting in the fluidised bed reactor B are ethylene and butene-1.

In Table 2 some structural properties (MIL, XS, $C_2H_4$ bonded, $C_4H_8$ bonded) of the prepared heterophasic copolymer are indicated.

Example 2

A heterophasic copolymer comprising a semi-crystalline polypropylene and a rubbery ethylene/butene-1 copolymer is produced by means of the process of the invention.

The same Ziegler-Natta catalyst system of Example 1 is used. The solid catalyst component is fed to the pre-contacting vessel, the weight ratio TEAL/sol.cat being of 17, the weight ratio TEAL/DCPMS being of 3. The above components are pre-contacted at a temperature of 10° C. for 22 minutes.

Slurry Polymerization

The activated catalyst discharged from the activation vessel is continuously fed to a slurry loop reactor to produce a semi-crystalline polypropylene.

According to the embodiment shown in FIG. 1, liquid propylene is polymerized in the loop reactor A using $H_2$ as the molecular weight regulator. No comonomer is fed to this reactor: the polymerization of propylene is carried out at a temperature of 70° C. and at a pressure of 43 bar.

A polypropylene slurry is discharged from the loop reactor A and is conveyed to the steam jacketed pipe 5. The polymer slurry flowing through the pipe 5 is subjected to heating up to reach the temperature of 85° C. with consequent evaporation of the liquid monomer.

The stream of solid polymer and evaporated propylene obtained at the outlet of the pipe 5 is sent to a high-pressure separation chamber 6, where the evaporated propylene is separated from the polymer particles. The tangential entry of the above stream ensures a gas/solid separation by centrifugal effect.

The high-pressure separation chamber 6 is operated at the pressure of 20 bar: the particles of solid polymer fall down by gravity towards the bottom of the chamber, while gaseous propylene passes through a bag filter 7 in the upper portion of the separation chamber 6, and is successively recycled to the loop reactor A.

Polypropylene particles are discharged from the bottom of separation chamber 6 and are conveyed to a low-pressure separation chamber 13, which is operated at a pressure of 1.9 bar.

The particles of solid polymer fall down by gravity towards the bottom of the separation chamber 13 with a further removal of gaseous propylene from the polymer particles.

The degassed polypropylene particles are then transferred to a couple of lock hoppers 16, 16' placed below the low-pressure separation chamber 13 and above the polymer bed 22 of the downstream fluidised bed reactor B.

The two hoppers 16 and 16' work intermittently in parallel according to the operative steps explained in connection to the description of FIG. 1. In particular, the polymer falls by gravity from the low-pressure separation chamber 13 into the lock hopper 16 or 16' and during the filling step the pressure inside each lock hopper is decreased to the same value existing in the separation chamber 13 (i.e. 1.9 bar). On the contrary, when the polymer is discharged from each lock hopper 16 or 16' and passes to the downstream gas-phase reactor B, each lock hopper is pressurized at the pressure existing downstream the compressor 24 in the recycle line R of the gas-phase reactor B.

Gas-Phase Polymerization

An ethylene/butene-1 copolymer is prepared in the fluidized bed reactor B according to the operative conditions shown in Table 1: the gas-phase polymerization in reactor B is carried out at a temperature of 79° C. and at a pressure of 16.4 bar.

A rubbery ethylene/butene-1 copolymer is obtained in the reactor B and a heterophasic copolymer deriving from the above sequential polymerization is continuously discharged from the fluidized bed reactor B.

As a result of the sequence of operative steps of present invention, the olefin monomer reacting in the upstream slurry reactor (i.e. propylene) is transferred to the downstream gas-phase reactor only in negligible amounts, so that the olefin monomers reacting in the fluidised bed reactor B are ethylene and butene-1.

In Table 2 some structural properties (MIL, XS, $C_2H_4$ bonded, $C_4H_8$ bonded) of the produced heterophasic copolymer are indicated.

TABLE 1

Polymerization Conditions

| | EXAMPLE 1 | EXAMPLE 2 |
|---|---|---|
| Operative conditions - $1^{st}$ Reactor | | |
| Temperature (° C.) | 70 | 70 |
| Pressure (bar) | 40 | 43 |
| $H_2$ (mol %) | 1.2 | 0.4 |
| $C_3H_6$ (mol %) | 98.8 | 99.6 |
| $C_4H_8$ (mol %) | — | — |
| $C_2H_4$ (mol %) | — | — |
| Split (wt %) | 80 | 79 |
| Operative conditions - $2^{nd}$ Reactor | | |
| Temperature (° C.) | 79 | 79 |
| Pressure (bar) | 18 | 16.4 |
| $H_2$ (mol %) | 24 | 18 |
| $C_3H_6$ (mol %) | — | — |
| $C_4H_8$ (mol %) | 34 | 38 |
| $C_2H_4$ (mol %) | 42 | 44 |

TABLE 2

FINAL COPOLYMER

| | MIL (dg/min) | XS (wt %) | $C_2H_4$ bonded (wt %) | $C_4H_8$ bonded (wt %) |
|---|---|---|---|---|
| Example 1 | 58 | 11.1 | 14.3 | 3.8 |
| Example 2 | 10 | 11.4 | 14.8 | 3.1 |

The invention claimed is:

1. A process for transferring polymer from an upstream slurry reactor to a downstream gas-phase reactor in a multi-stage polymerization of olefins comprising the following steps:
   a) heating a slurry comprising liquid polymerization medium and polyolefin particles discharged from the upstream reactor to evaporate the liquid polymerization medium, thereby forming an evaporated phase;
   b) separating the polyolefin particles from the evaporated phase in at least a separation chamber;
   c) transferring the separated polyolefin particles to said downstream reactor by means of lock hoppers working intermittently in parallel, where one of said lock hoppers is continuously filled with the polymer coming from said separation chamber, while simultaneously the other one is continuously pressurized by means of a pressurization gas coming from said downstream reactor.

2. The process according to claim 1, wherein said liquid polymerization medium comprises at least one olefin monomer, hydrogen as a molecular weight regulator and optionally an inert hydrocarbon.

3. The process according to claim 1, wherein said upstream polymerization reactor is a loop reactor.

4. The process according to claim 1, wherein said downstream gas-phase reactor is selected from fluidized-bed reactors, stirred bed reactors and polymerization reactors having two distinct interconnected polymerization zones.

5. The process according to claim 1, wherein step a) is carried out in a steam jacketed pipe at a temperature in a range from 80 to 100° C.

6. The process according to claim 1, wherein said separation chamber of step b) is provided with bag filters.

7. The process according to claim 1, wherein step b) is carried out in a high pressure separation chamber and a low pressure separation chamber.

8. The process according to claim 7, wherein the high pressure separation chamber is operated at a pressure ranging from 10 to 28 bar.

9. The process according to claim 7, wherein the low pressure separation chamber is operated at a pressure ranging from 1.1 bar to 4.0 bar.

10. The process according to claim 1, further comprising that the lock hoppers of step c) operate in a continuous sequence of operations comprising:
 (1) loading with polymer coming from step b), while maintaining the hopper isolated from the downstream reactor;
 (2) pressurizing by means of a gas comprising the reaction mixture from the downstream reactor, while maintaining the hopper isolated from the separation chamber of step b).

11. The process according to claim 10, wherein during said pressurization (2) the polymer is discharged from said lock hopper and transferred to the downstream reactor.

12. The process according to claim 10, wherein when one of said lock hoppers is involved with step (1), the other one is involved with step (2).

13. The process according to claim 1, wherein said pressurization gas of step c) comes from the recycle line of said downstream reactor at a point downstream a compressor and upstream a heat exchanger.

14. A polymerization apparatus comprising an upstream slurry reactor, a downstream gas-phase reactor and a transfer device transferring the polymer from said upstream reactor to said downstream reactor, the downstream gas-phase reactor having an external recycle line R that continuously recycles the fluidization gas through said reactor, said transfer device comprising:
 a vaporizer for heating the polyolefin slurry discharged from said upstream reactor;
 at least one separation chamber for separating the polyolefin particles from the evaporated phase; and
 lock hoppers placed in a parallel arrangement, directly connected to said recycle line R of said downstream reactor and in connection with the polymerization zone of said downstream reactor.

15. The apparatus according to claim 14, wherein said vaporizer is a steam jacketed pipe.

16. The apparatus according to claim 14 further comprising a high pressure separation chamber and a low pressure separation chamber.

17. The apparatus according to claim 14, wherein said lock hoppers are placed below said at least one separation chamber and above the polymer bed of said downstream reactor.

18. The apparatus according to claim 14, wherein said lock hoppers comprise bottom discharge valves, connected with two transfer pipes, which alternatively transfer the polymer particles into the polymer bed of said downstream reactor.

19. The apparatus according to claim 18, wherein said two transfer pipes are inclined of an angle, with respect to vertical line, comprised between 15° and 30°.

* * * * *